United States Patent
Vassilieff

(10) Patent No.: US 8,849,601 B2
(45) Date of Patent: Sep. 30, 2014

(54) METHOD FOR SELF-CALIBRATING AN ACCELEROMETER MOUNTED ON A WHEEL OF A VEHICLE WHILE SAID VEHICLE IS MOVING

(75) Inventor: Youri Vassilieff, Toulouse (FR)

(73) Assignee: Continental Automotive France, Toulouse (FR)

( * ) Notice: Subject to any disclaimer, the term of this patent is extended or adjusted under 35 U.S.C. 154(b) by 521 days.

(21) Appl. No.: 13/203,561

(22) PCT Filed: Feb. 19, 2010

(86) PCT No.: PCT/EP2010/001045
§ 371 (c)(1),
(2), (4) Date: Aug. 26, 2011

(87) PCT Pub. No.: WO2010/099877
PCT Pub. Date: Sep. 10, 2010

(65) Prior Publication Data
US 2011/0307205 A1    Dec. 15, 2011

(30) Foreign Application Priority Data
Mar. 3, 2009    (FR) ..................... 09 00952

(51) Int. Cl.
*G01P 21/00* (2006.01)
*G01P 3/22* (2006.01)
*G01C 25/00* (2006.01)
*G01P 15/00* (2006.01)

(52) U.S. Cl.
CPC . *G01P 21/00* (2013.01); *G01P 3/22* (2013.01); *G01C 25/00* (2013.01); *G01P 15/00* (2013.01)
USPC ............. 702/96; 702/141; 702/142; 702/147; 702/148

(58) Field of Classification Search
USPC ................ 702/96, 141, 142, 146, 147, 148
See application file for complete search history.

(56) References Cited

U.S. PATENT DOCUMENTS 5,307,274 A * 4/1994 Takata et al. ................. 701/70
8,095,309 B2 * 1/2012 Ryu et al. ..................... 73/178 R
(Continued)

FOREIGN PATENT DOCUMENTS

DE  10 2006 020471 A1   11/2007
EP      0 492 626 A2    7/1992
(Continued)

OTHER PUBLICATIONS

International Search Report, dated Apr. 6, 2010, from corresponding PCT application.

*Primary Examiner* — Sujoy Kundu
*Assistant Examiner* — Paul D Lee
(74) *Attorney, Agent, or Firm* — Young & Thompson

(57) ABSTRACT

A method for self-calibrating, while a vehicle is moving, an accelerometer mounted on a wheel of the vehicle so that its plane of maximum sensitivity is secant with the axis of rotation of the wheel. The average value and on the other hand the amplitude of the signal representative of the acceleration Acc-read delivered by the accelerometer are calculated first, for an established speed of the vehicle, based on measurements performed by the accelerometer during a time window corresponding to the time needed for the wheel to complete n rotations, with n>1, then the values of the gain C1 and of the offset C2 of the accelerometer are determined by resolving the system of two equations with two unknown values:

$$\omega^2 R = C1 \times (\text{average value of Acc-read}) + C2$$

$$2g = C1 \times (\text{amplitude of Acc-read})$$

with:
ω the speed of rotation of the wheel,
R the radius of the wheel.

7 Claims, 1 Drawing Sheet

(56) References Cited

U.S. PATENT DOCUMENTS

| | | |
|---|---|---|
| 2003/0061859 A1* | 4/2003 | Rothoff .......................... 73/1.37 |
| 2006/0001533 A1 | 1/2006 | Bessho et al. |
| 2006/0044125 A1* | 3/2006 | Pierbon ........................ 340/442 |
| 2006/0142911 A1* | 6/2006 | Allard et al. .................... 701/29 |
| 2006/0235641 A1 | 10/2006 | Fink et al. |
| 2010/0010770 A1 | 1/2010 | Helck |

FOREIGN PATENT DOCUMENTS

| | | |
|---|---|---|
| EP | 0 931 679 A1 | 7/1999 |
| JP | 2006/015955 A | 1/2006 |

* cited by examiner

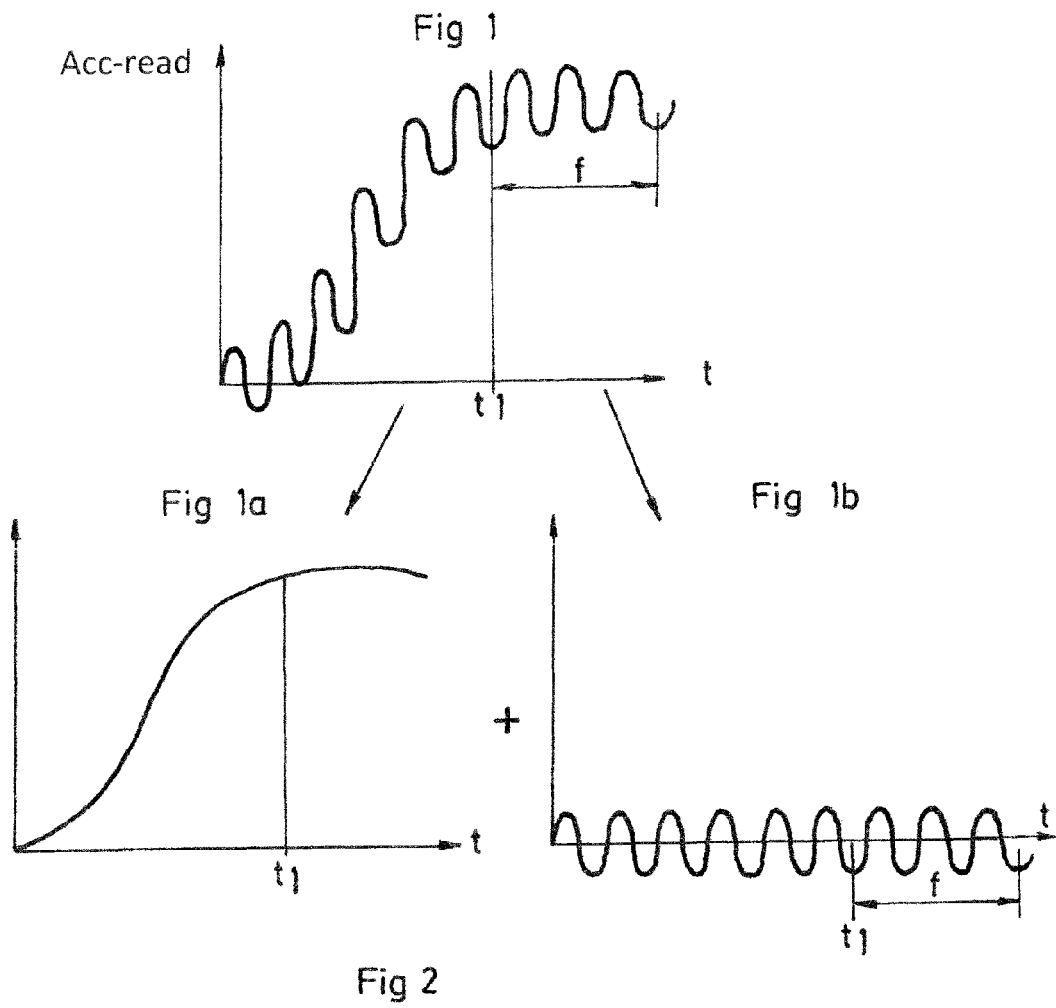
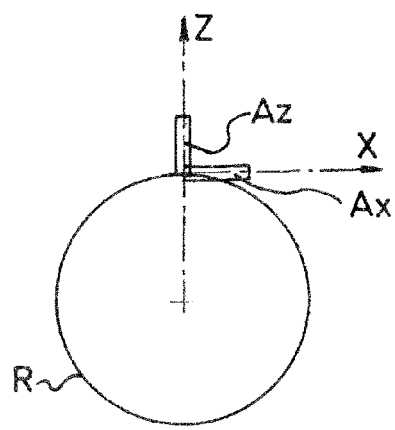

METHOD FOR SELF-CALIBRATING AN ACCELEROMETER MOUNTED ON A WHEEL OF A VEHICLE WHILE SAID VEHICLE IS MOVING

The invention relates to a method for self-calibrating, while a vehicle is moving, an accelerometer having a plane of maximum sensitivity and designed to supply a signal representative of gravity, mounted on a wheel of the vehicle so that its plane of maximum sensitivity is secant with the axis of rotation of the wheel.

More and more automotive vehicles are being fitted with systems for monitoring and/or measuring parameters comprising sensors mounted on said vehicle.

As an example with regard to such systems, there may be cited the monitoring systems comprising sensors mounted on each of the wheels of vehicles, dedicated to measuring parameters, such as pressure and/or temperature of the tires fitted on these wheels, and designed to inform the driver of any abnormal variation in the measured parameter.

These monitoring systems conventionally comprise:
  fitted on each wheel of the vehicle, an electronic module incorporating measurement sensors, a microprocessor and a radiofrequency transmitter,
  and, mounted on the vehicle, a central unit for receiving signals transmitted by the electronic modules, provided with a computer incorporating a radiofrequency receiver connected to an antenna.

Furthermore, usually, these monitoring systems comprise at least one accelerometer incorporated in each electronic module and designed in particular to supply information for determining the state of movement of the vehicle (stationary or moving), and, when the vehicle is moving, information for determining the speed of rotation of the wheel fitted with said accelerometer.

These accelerometers do, however, have a major drawback in that their performance levels are subject to significant drifts in time which means that they have to be regularly calibrated. Now, each of these calibration operations is costly so these operations are carried out seldom, in particular in the automotive sector, and the accelerometers show degraded performance levels.

Furthermore, during any calibration operations, the accelerometers are usually calibrated within a range of between +1 g and −1 g, so as to avoid causing the components to accelerate. Now, when they are mounted on wheels of a vehicle, these accelerometers are used within much wider ranges, typically extending between 0 g and 100 g, so that the accuracies obtained are very relative.

The present invention aims to overcome this drawback and its objective is to provide a calibration method that makes it possible, while a vehicle is moving, to gauge the gain and offset of accelerometers mounted on wheels of said vehicle.

To this end, the aim of the invention is a method for self-calibrating, while a vehicle is moving, an accelerometer having a plane of maximum sensitivity and designed to supply a signal representative of gravity, mounted on a wheel of the vehicle so that its plane of maximum sensitivity is secant with the axis of rotation of the wheel. According to the invention, this method consists, for an established speed of the vehicle:
  in calculating on the one hand the average value and on the other hand the amplitude of the signal representative of the acceleration Acc-read delivered by the accelerometer, based on measurements performed by means of the accelerometer during a time window corresponding to the time needed for the wheel to complete n rotations, with $n>1$,
  and in determining the values of the gain C1 and of the offset C2 of the accelerometer by resolving the system of two equations with two unknowns values:

$$\omega^2 R = C1 \times (\text{average value of Acc-read}) + C2$$

$$2g = C1 \times (\text{amplitude of Acc-read})$$

with:
  $\omega$ the speed of rotation of the wheel,
  R the radius of the wheel.

Such a method therefore makes it possible to dynamically calibrate, while a vehicle is moving, each of the accelerometers mounted on the wheels of said vehicle. The only constraint lies in obtaining an established speed during a time period that is at least equal to the time window necessary to record the measurements.

According to this method, the calculation of the average value and of the amplitude of the signal representative of the acceleration Acc-read can be performed directly on the basis of the measured values, the amplitude corresponding to the difference between the measured maximum and minimum values, and the average value corresponding to the half-sum of these maximum and minimum values.

However, in order to remove in particular measurement aberrations, and advantageously according to the invention, the signal representative of the acceleration Acc-read delivered by the accelerometer is filtered by means of a 3 Hz-30 Hz band-pass filter, designed to supply a signal whose amplitude corresponds to the amplitude of said signal representative of the acceleration Acc-read.

Similarly, the signal representative of the acceleration Acc-read delivered by the accelerometer is advantageously filtered by means of a low-pass filter having a cut-off frequency equal to 1 Hz, designed to supply a signal with a value equal to the average value of said signal representative of the acceleration Acc-read.

Furthermore, the average value can then be obtained by a smoothing method of the moving average type, over a predetermined number of samples.

Moreover, in order to determine the speed of rotation $\omega$ of each wheel, and advantageously according to the invention, the number of times when the signal representative of the acceleration Acc-read delivered by the accelerometer intersects the calculated average value is recorded during each time window, so as to determine the rotation period of the wheel, and to deduce therefrom the speed of rotation $\omega$ of said wheel.

Furthermore, in order to make the method independent of the diameter of the rims mounted on the vehicle, a predetermined average value r of the radius of the wheel is set for all the vehicles of one and the same platform.

The method according to the invention can in particular be implemented in a view to self-calibrate two accelerometers having orthogonal planes of maximum sensitivity X, Z, mounted on one and the same wheel. In this case, and advantageously according to the invention:
  the gain C1x, C1z and the offset C2x, C2z of each accelerometer are initially calculated dynamically, while the vehicle is moving, according to the method as described hereinabove,
  then, when the vehicle is stationary, the values x, z of the signals representative of the acceleration Acc-read delivered by the accelerometers are recorded, the coordinates, in an orthonormal coordinate system (X, Z), of a point, on the one hand, positioned on a straight-line segment linking the coordinate points (C2x, C2z) and (x, z), and, on the other hand, distant by a value equal to gravity g from the point (x, z), are calculated, and the values of said calculated coordinates are assigned to the respective offsets C2x, C2z of the accelerometers, and the offset values C2x, C2z calculated when the vehicle is stationary are used to dynamically calibrate, while the vehicle is moving, the values of the respective gains C1x, C1z of the accelerometers.

From the gain and offset values initially calculated dynamically, such a method makes it possible to refine the values of the offsets when the vehicle is stationary, then to reintegrate these values when it is moving in order to refine the gain values.

Other features, aims and advantages of the invention will emerge from the following detailed description with reference to the appended drawings which represent a preferential nonlimiting exemplary embodiment thereof. In these drawings:

FIG. 1 is a curve representative of the basic signal delivered by an accelerometer, and FIGS. 1a and 1b are curves representative of the two signals derived from the basic signal, obtained according to the inventive method, and FIG. 2 is a diagram representative of a wheel equipped with two accelerometers, intended to illustrate an application of the invention.

The method according to the invention aims to allow for the self-calibration, while a vehicle is moving, of an accelerometer such as Ax having a plane of maximum sensitivity X and designed to supply a signal representative of gravity, said accelerometer being mounted on a wheel R of the vehicle so that its plane of maximum sensitivity X is secant with the axis of rotation of the wheel R, and, in the example, perpendicular to said axis of rotation.

This self-calibration method is implemented when the vehicle has reached an established speed which has a corresponding average constant acceleration value, represented, by way of example, by the region corresponding to the values $t \geq t1$ in FIG. 1 which represents the signal delivered by the accelerometer Ax.

According to this method, and first of all, on the one hand the average value and on the other hand the amplitude of the signal representative of the acceleration Acc-read delivered by the accelerometer are calculated, based on measurements performed by means of the accelerometer Ax during a time window f corresponding to the time needed for the wheel R to complete n rotations, with n, for example, equal to 2 or 3.

The following step consists in determining the values of the gain C1 and of the offset C2 of the accelerometer Ax by resolving the system of two equations with two unknown values:

$$\omega^2 r = C1 \times (\text{average value of Acc-read}) + C2$$

$$2g = C1 \times (\text{amplitude of Acc-read})$$

with:

ω the speed of rotation of the wheel, r the average value r of a wheel radius set for all the vehicles of one and the same platform.

For this resolution, the number of times when the signal representative of the acceleration Acc-read delivered by the accelerometer Ax intersects the calculated average value is recorded during each time window f, so as to determine the rotation period of the wheel R, and to deduce the speed of rotation ω of said wheel.

Furthermore, also for this resolution, in order to increase the accuracy of the calculations, and as represented in FIGS. 1a and 1b:

the signal representative of the acceleration Acc-read delivered by the accelerometer Ax is filtered by means of a low-pass filter having a cut-off frequency equal to 1 Hz, designed to supply a signal, represented in FIG. 1a, with a value equal to the average value of said signal, and the signal representative of the acceleration Acc-read delivered by the accelerometer Ax is filtered by means of a 3 Hz-30 Hz band-pass filter, designed to supply a signal, represented in FIG. 1b, whose amplitude corresponds to the amplitude of said signal.

Such a method, which can be implemented on demand, for example on significant temperature variations, after travelling at high speed, etc., leads, possibly by iterations, to obtain perfectly calibrated gain and offset values.

The accuracy of the self-calibration method according to the invention can, furthermore, be increased in the case where the wheels R of the vehicle are equipped, as represented in FIG. 2, with two accelerometers Ax, Az having orthogonal planes of maximum sensitivity X, Z.

In this particular case, the first step consists in initially calculating the gain C1x, C1z and the offset C2x, C2z of each accelerometer Ax, Az dynamically, while the vehicle is moving, according to the method described hereinabove with reference to FIGS. 1, 1a and 1b.

Then, when the vehicle is stationary:

the values x, z of the signals representative of the acceleration Acc-read delivered by the accelerometers Ax, Az are recorded, the coordinates, in an orthonormal coordinate system X, Z, of a point, on the one hand, positioned on a straight-line segment linking the coordinate points (C2x, C2z) and (x, z), and, on the other hand, distant by a value equal to gravity g from the point (x, z), are calculated, and the values of said calculated coordinates are assigned to the respective offsets C2x, C2z of the accelerometers Ax, Az.

Finally, the offset values C2x, C2z calculated when the vehicle is stationary are used to dynamically refine, while the vehicle is moving, the values of the respective gains C1x, C1z of the accelerometers Ax, Az.

It should be noted that, in this last step, two values are obtained for each gain C1 each resulting from the resolution of one of the two equations. The final result is therefore equal to the average of the two values obtained.

The invention claimed is:

1. A method for self-calibrating, while a vehicle is moving, an accelerometer (Ax) having a plane of maximum sensitivity (X) and designed to supply a signal representative of gravity, mounted on a wheel (R) of the vehicle so that its plane of maximum sensitivity (X) is secant with the axis of rotation of the wheel (R), said method being characterized in that, for an established speed of the vehicle:

on the one hand the average value and on the other hand the amplitude of the signal representative of the acceleration Acc-read delivered by the accelerometer are calculated by a computer processor, based on measurements performed by means of the accelerometer (Ax) during a time window (f) corresponding to the time needed for the wheel (R) to complete n rotations, with n>1, and the values of a gain C1 and of an offset C2 of the accelerometer (Ax) are determined by the computer processor resolving the system of two equations with two unknown values:

$$\omega^2 r = C1 \times (\text{average value of Acc-read}) + C2$$

$$2g = C1 \times (\text{amplitude of Acc-read})$$

with:
ω the speed of rotation of the wheel,
r the radius of the wheel (R), and
g the value of the Earth's gravity.

2. The self-calibration method as claimed in claim 1, characterized in that the signal representative of the acceleration Acc-read delivered by the accelerometer (Ax) is filtered by means of a 3 Hz-30 Hz band-pass filter, designed to supply a signal whose amplitude corresponds to the amplitude of said signal representative of the acceleration Acc-read.

3. The self-calibration method as claimed in claim 2, characterized in that the signal representative of the acceleration Acc-read delivered by the accelerometer (Ax) is filtered by means of a low-pass filter having a cut-off frequency equal to 1 Hz, designed to supply a signal with a value equal to the average value of said signal representative of the acceleration Acc-read.

4. The self-calibration method as claimed in claim 1, characterized in that the signal representative of the acceleration Acc-read delivered by the accelerometer (Ax) is filtered by means of a low-pass filter having a cut-off frequency equal to 1 Hz, designed to supply a signal with a value equal to the average value of said signal representative of the acceleration Acc-read.

5. The self-calibration method as claimed in claim 1, characterized in that the number of times when the signal representative of the acceleration Acc-read delivered by the accelerometer (Ax) intersects the calculated average value is recorded during each time window (f), so as to determine the rotation period of the wheel (R), and to deduce therefrom the speed of rotation ω of said wheel.

6. The self-calibration method as claimed in claim 1, characterized in that a predetermined average value r of the radius of the wheel (R) is set for all the vehicles of one and the same platform.

7. A method for self-calibrating two accelerometers (Ax, Az) mounted on one and the same wheel (R), the first accelerometer (Ax) having an axis in a first direction (x) and the second accelerometer (Ay) having an axis in a second axis (z) orthogonal to the first axis (x), such the two accelerometers together have orthogonal planes of maximum sensitivity (X, Z), consisting:
in initially calculating the gain C1x, C1z and the offset C2x, C2z of each accelerometer (Ax, Az) dynamically, while the vehicle is moving, according to the method conforming to claim 1, the gain C1x and the offset C2x being calculated for the first accelerometer (Ax) and the gain C1z and the offset C2z being calculated for the second accelerometer,
said method being characterized in that it also consists:
when the vehicle is stationary,
in recording the values (x, z) of the signals representative of the acceleration Acc-read delivered by the accelerometers (Ax, Az),
in calculating the coordinates, in an orthonormal coordinate system (X, Z),
i) of a point positioned on a straight-line segment linking the coordinate points (C2x, C2z) and (x, z), and ii) of a point distant by a value equal to gravity g from the point (x, z), and
in assigning the values of said calculated coordinates to the respective offsets C2x, C2z of the accelerometers (Ax, Az),
and in using the offset values C2x, C2z calculated when the vehicle is stationary to dynamically calibrate, while the vehicle is moving, the values of the respective gains C1x, C1z of the accelerometers (Ax, Az).

* * * * *